(12) United States Patent
Kato et al.

(10) Patent No.: US 11,007,702 B2
(45) Date of Patent: May 18, 2021

(54) RESIN MEMBER AND WEARABLE BAND

(71) Applicant: Seiko Epson Corporation, Tokyo (JP)

(72) Inventors: Makoto Kato, Shiojiri (JP); Hiroaki Hosomi, Shiojiri (JP)

(73) Assignee: Seiko Epson Corporation

(*) Notice: Subject to any disclaimer, the term of this patent is extended or adjusted under 35 U.S.C. 154(b) by 67 days.

(21) Appl. No.: 16/356,252

(22) Filed: Mar. 18, 2019

(65) Prior Publication Data

US 2019/0283309 A1 Sep. 19, 2019

(30) Foreign Application Priority Data

Mar. 19, 2018 (JP) .............................. JP2018-050563

(51) Int. Cl.
| | |
|---|---|
| *B29C 55/06* | (2006.01) |
| *B29C 55/00* | (2006.01) |
| *C08L 1/02* | (2006.01) |
| *C08K 9/04* | (2006.01) |
| *C08K 7/02* | (2006.01) |
| *A44C 5/00* | (2006.01) |
| *B29K 83/00* | (2006.01) |
| *B29K 75/00* | (2006.01) |
| *B29K 25/00* | (2006.01) |
| *B29K 23/00* | (2006.01) |
| *B29K 67/00* | (2006.01) |
| *B29K 27/12* | (2006.01) |
| *B29L 29/00* | (2006.01) |

(52) U.S. Cl.
CPC ................ *B29C 55/06* (2013.01); *A44C 5/00* (2013.01); *B29C 55/005* (2013.01); *C08K 7/02* (2013.01); *C08K 9/04* (2013.01); *C08L 1/02* (2013.01); *B29K 2023/00* (2013.01); *B29K 2025/04* (2013.01); *B29K 2027/12* (2013.01); *B29K 2067/00* (2013.01); *B29K 2075/00* (2013.01); *B29K 2083/00* (2013.01); *B29L 2029/00* (2013.01); *C08K 2201/003* (2013.01)

(58) Field of Classification Search
CPC ......... B29C 55/06; B29C 55/005; C08L 1/02; B29L 2029/00; C08K 7/02; C08K 9/04
See application file for complete search history.

(56) References Cited

U.S. PATENT DOCUMENTS

2011/0051569 A1* 3/2011 Kitahara ................. B29C 70/70
368/282
2017/0296707 A1* 10/2017 Joyce ..................... C08L 23/12

FOREIGN PATENT DOCUMENTS

JP 2012-135659 A 7/2012

* cited by examiner

*Primary Examiner* — Robert D Harlan
(74) *Attorney, Agent, or Firm* — Harness, Dickey & Pierce, P.L.C.

(57) ABSTRACT

A resin member has a longitudinal direction, includes a stretchable portion having an extending portion extending in a direction crossing the longitudinal direction, when the resin member is stretched in the longitudinal direction, an angle at which the extending portion extends changes, and the material of the stretchable portion contains cellulose fibers and a resin.

18 Claims, 3 Drawing Sheets

RESIN MEMBER AND WEARABLE BAND

The present application is based on, and claims priority from Japanese Application Serial Number 2018-050563, filed Mar. 19, 2018, the disclosure of which is hereby incorporated by reference herein in its entirety.

BACKGROUND

1. Technical Field

The present disclosure relates to a resin member and a wearable band.

2. Related Art

There have existed ornaments to be worn on bodies of animals including humans such as bracelets, chokers, anklets, and watches for a long time. Further, in the field of sports, etc., the measurement of various physical conditions during exercise is carried out by attaching a sensor to the body.

In recent years, a sensor is getting smaller and has higher performance, and it becomes easy to integrate an implement with a measuring device in order to obtain such physical information more easily, and for example, an attempt to obtain physical information such as a pulse rate during exercise has been made by mounting a pulse meter or the like on a watch so as to be made wearable.

In order to attach an ornament, a watch, or the like to the body, a member for attachment is required to have a sufficient strength. For example, JP-A-2012-135659 (Patent Document 1) discloses a band including a support layer interwoven with carbon fibers or the like.

Wearable sensors are required not to easily cause vibration due to exercise or displacement or the like due to sweat or the like. When wearing such a wearable sensor, for example, the wearable sensor is required to be brought into close contact with a wrist, an ankle, or the like without tightening too much. Therefore, a material constituting this is required to have not only a strength, but also moderate stretchability.

SUMMARY

A resin member according to an aspect of the present disclosure has a longitudinal direction, and includes a stretchable portion having an extending portion extending in a direction crossing the longitudinal direction, in which when the resin member is stretched in the longitudinal direction, an angle at which the extending portion extends changes, and the material of the stretchable portion contains a cellulose fiber and a resin.

In the resin member according to the aspect of the present disclosure, the cellulose fiber may be dyed.

In the resin member according to the aspect of the present disclosure, the cellulose fiber may have a diameter of 4.0 nm or more and 1.0 μm or less.

In the resin member according to the aspect of the present disclosure, the cellulose fiber may have an aspect ratio of 100 or more.

In the resin member according to the aspect of the present disclosure, the resin may be an elastomer.

In the resin member according to the aspect of the present disclosure, the resin may be one type or a mixture of two or more types selected from a urethane-based resin, a silicone-based resin, a styrenic resin, an ester-based resin, an olefinic resin, a fluorine-based resin, and a diene-based resin.

In the resin member according to the aspect of the present disclosure, the cellulose fiber may be contained in an amount of 0.1 mass % or more and 50.0 mass % or less with respect to the total amount of the resin member.

In the resin member according to the aspect of the present disclosure, the cellulose fiber may have a molecular structure represented by the following formula (I).

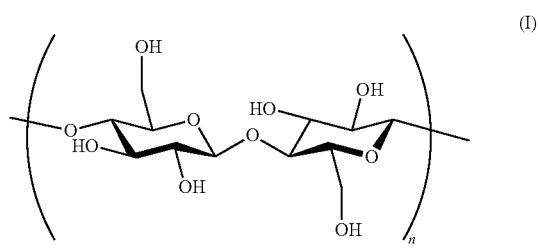

In the formula (I), n represents an integer of 10 or more and 100000 or less.

A wearable band according to an aspect of the present disclosure includes the resin member according to the aspect of the present disclosure.

DESCRIPTION OF EXEMPLARY EMBODIMENTS

Hereinafter, embodiments of the present disclosure will be described. The embodiments described below are for describing examples of the present disclosure. The present disclosure is not limited to the embodiments below and also includes various modifications which can be embodied without changing the gist of the present disclosure. Note that all the configurations described below are not necessarily essential components of the present disclosure.

1. RESIN MEMBER

Figure 1:
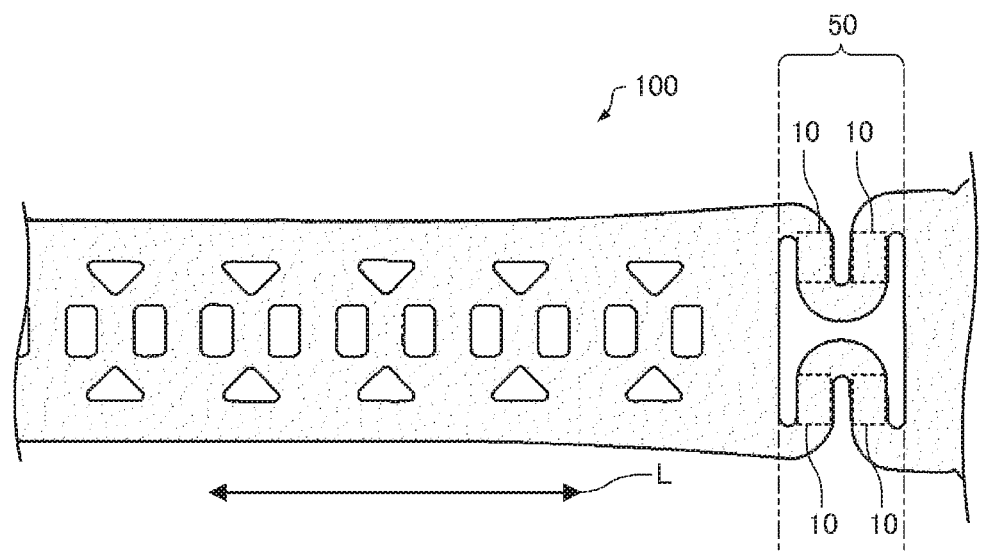
FIG. 1 is a schematic view of an example of a resin member according to an embodiment when seen in a plane view.

Hereinafter, an embodiment of a resin member will be described with reference to the drawings. FIG. 1 is a schematic view of a resin member 100 as one embodiment of the resin member according to this embodiment when seen in a plane view.

FIG. 1 is a schematic view of the resin member 100 in the form of a belt when seen in a plane view. The resin member 100 according to this embodiment has a longitudinal direction L. Further, the resin member 100 includes a stretchable portion 50 having an extending portion 10 extending in a direction crossing the longitudinal direction L. The material of the stretchable portion 50 contains cellulose fibers and a resin. Hereinafter, examples of the shape of the resin member will be described, and the cellulose fibers and the resin will be described thereafter.

1.1. Shape of Resin Member

The resin member 100 has the longitudinal direction L. The "longitudinal direction L" refers to a direction on which the resin member 100 becomes the longest when the resin member 100 is planarly spread out in an arbitrary direction without destroying it. For example, in the case where the resin member 100 is a band of a watch, even if the resin member 100 is in a curved shape so as to fit around a wrist in a state where a force is not applied, by placing this on a flat plane and deforming (spreading out) this so as to be along the flat plane, the band can be extended without destroying it. The direction on which the band extends in this state is the longitudinal direction. The thickness (the depth direction in FIG. 1) of the resin member 100 is arbitrary, but is assumed to be a thickness capable of defining the longitudinal direction L as described above. In FIG. 1, the longitudinal direction L of the resin member 100 is indicated by the arrow.

1.1.1. Stretchable Portion

The resin member 100 according to this embodiment includes the stretchable portion 50. The stretchable portion 50 can constitute part or all of the resin member 100. Further, a plurality of stretchable portions 50 may be provided in the resin member 100. The stretchable portion 50 is formed so as to cross the longitudinal direction L of the resin member 100. In other words, the stretchable portion 50 is a region including both ends in the direction crossing the longitudinal direction L of the resin member 100. Therefore, in the case where the resin member 100 is pulled in the longitudinal direction L, the tensile stress is applied to the stretchable portion 50.

The stretchable portion 50 is elastically deformed within an elastic limit. Therefore, in the stretchable portion 50, when the resin member 100 is pulled in the longitudinal direction L, tension occurs to generate a restoring force. The stretchable portion 50 is formed from a material which is not easily plastically deformed, however, even if it is plastically deformed, it can exhibit a given restoring force. In the case where the resin member 100 is wound around a subject (a wrist or the like), the stretchable portion 50 has a function to bring the resin member 100 into close contact with the subject so that the resin member 100 is not easily shifted from the position where it is wound.

The restoring force of the stretchable portion 50 is generated mainly based on structural elasticity rather than elasticity (for example, rubber elasticity) by simple expansion and contraction of the member. The stretchable portion 50 includes the extending portion 10 extending in a direction crossing the longitudinal direction L, and when the resin member 100 is stretched in the longitudinal direction L, an angle at which the extending portion 10 extends changes. Here, the "angle" is an angle formed by a direction in which the extending portion 10 extends and the longitudinal direction L, and may be either an acute angle or an obtuse angle.

The stretchable portion 50 includes such an extending portion 10, and therefore exhibits a structural restoring force. The stretchable portion 50 may have a structure that generates a restoring force by simple expansion and contraction of the member, however, it is sometimes difficult to increase the magnitude of tensile distortion, or the restoring force sometimes becomes too large, and therefore, it is preferred that the stretchable portion 50 has no or few structures that simply expand and contract.

1.1.2. Extending Portion

Figure 2:
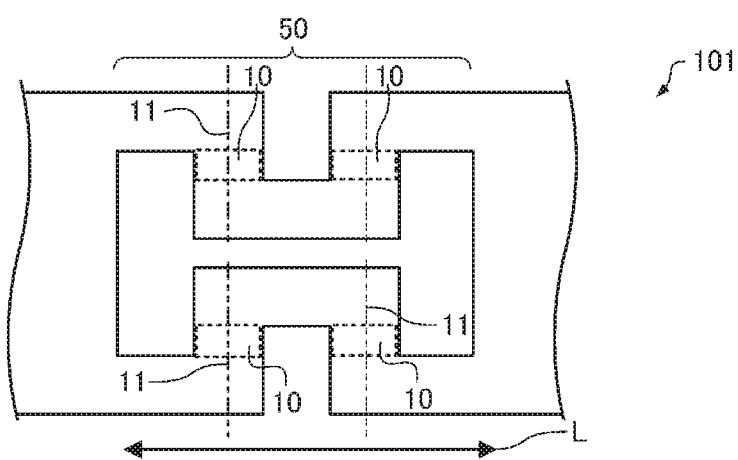
FIG. 2 is a schematic view of an example of a resin member according to an embodiment when seen in a plane view.
Figure 3:
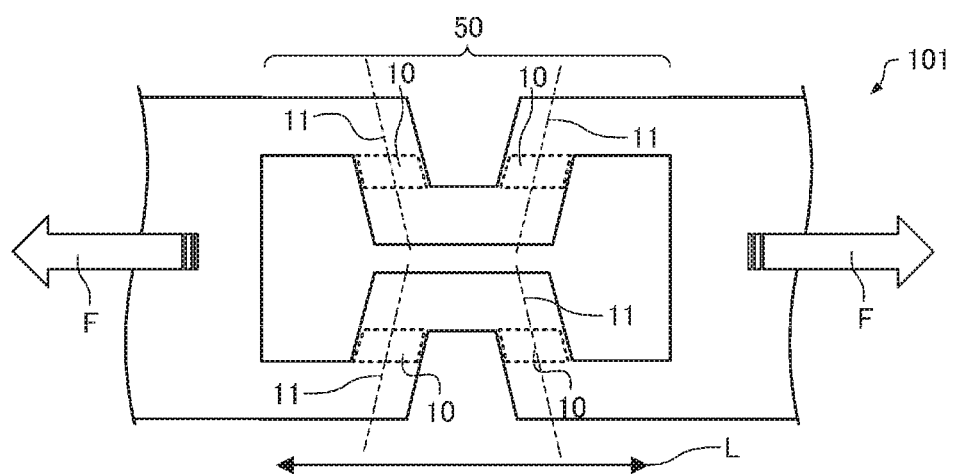
FIG. 3 is a schematic view of an example of a resin member according to an embodiment when seen in a plane view.

Hereinafter, the extending portion 10 of the stretchable portion 50 will be described with reference to the drawings. FIG. 2 is a schematic view of a resin member 101 including an example of the extending portion 10. FIG. 3 is a schematic view showing a change in the extending portion 10 of the stretchable portion 50 when the resin member 101 is stretched in the longitudinal direction. In FIGS. 2 and 3, the longitudinal direction L of the resin member 101 is indicated by the arrow.

In the example shown in FIGS. 2 and 3, the extending portion 10 extends in a direction crossing (substantially orthogonal to) the longitudinal direction L. In FIGS. 2 and 3, the direction in which the extending portion 10 extends (elongates) is defined as an extending direction 11 and indicated by an imaginary line (the same applies to the following FIGS. 4 to 7). That is, the extending direction 11 is a direction crossing (in FIG. 2, substantially orthogonal to) the longitudinal direction L. When the resin member 101 is stretched in the longitudinal direction L, the direction in which the extending portion 10 extends changes.

The resin member 101 includes the stretchable portion 50 and two base portions 60, and the base portions 60 which are regions other than the stretchable portion 50 of the resin member 101 are connected to each other through the stretchable portion 50. In the stretchable portion 50, one extending portion 10 may be provided or a plurality of extending portions 10 may be provided. In the example shown in FIG. 2, in the stretchable portion 50, four extending portions 10 are provided. The extending direction 11 of the extending portion 10 is not particularly limited as long as it is a direction crossing the longitudinal direction L. The extending direction 11 of the extending portion 10 may be along a curved line. Further, in this example, two base portions 60 are drawn, however, the stretchable portion 50 may be disposed in an end portion in the longitudinal direction L of the resin member 101.

FIG. 3 shows a state which is changed from the state shown in FIG. 2 to a state where a tensile stress F along the longitudinal direction L of the resin member 101 is applied. Also in FIG. 3, the direction in which the extending portion 10 extends (elongates) is defined as the extending direction 11 and indicated by an imaginary line. In FIG. 3, an angle formed by the extending direction 11 and the longitudinal direction L is different from the angle before applying the stress F (FIG. 2). In other words, although the extending direction 11 crosses the longitudinal direction L, it crosses at an angle different from the angle before applying the stress F (FIG. 2). That is, when the resin member 101 is stretched in the longitudinal direction L, the angle at which (the direction in which) the extending portion 10 extends changes.

In the case where the resin member 101 is stretched in the longitudinal direction L, a portion other than the extending portion 10 may or may not be deformed. In the example shown in FIG. 3, a portion of the stretchable portion 50 in the vicinity of the extending portion 10 is deformed. Further, in the case where the resin member 101 is stretched in the longitudinal direction L, in the extending portion 10 and a portion other than the extending portion 10, deformation (elongation) or the like by pulling may occur.

As a result of deformation as shown in FIG. 3, the stretchable portion 50 of the resin member 101 exhibits a restoring force mainly based on structural elasticity. The restoring force of the stretchable portion 50 of the resin member 101 may be based on elasticity (for example, rubber elasticity) by simple expansion and contraction of the member other than structural elasticity. Further, if the tensile distortion is within the elastic limit, the member can be restored to the state shown in FIG. 2 when the member is returned to the state where the stress F is not applied. Further, even if the tensile distortion exceeds the elastic limit, the member is restored to a state close to the state shown in FIG. 2 in some cases when the member is returned to the state where the stress F is not applied. In the resin member 101 according to this embodiment, the material of the stretchable portion contains cellulose fibers and a resin (which will be described later), and therefore, the elastic limit is high, and the deformed structure is easily restored to the original structure.

Figure 4:
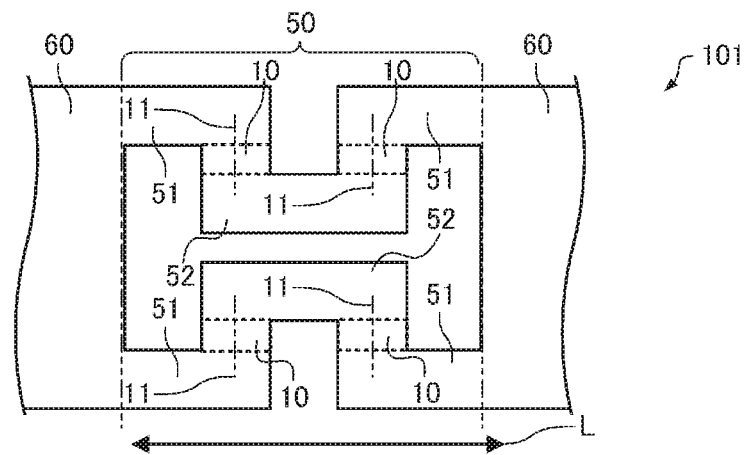
FIG. 4 is a schematic view of an example of a resin member according to an embodiment when seen in a plane view.

FIG. 4 is a schematic view of the resin member 101 for illustrating the extending portion 10 by different expressions from FIG. 2. In FIG. 2, it is described that the extending portion 10 extends in a direction substantially orthogonal to the longitudinal direction L, and the extending direction 11 is a direction crossing (substantially orthogonal to) the longitudinal direction L. However, as shown in FIG. 4, another description is also possible with respect to the extending portion 10. Also in FIG. 4, the base portions 60 which are regions other than the stretchable portion 50 of the resin member 101 are connected to each other through the stretchable portion 50.

With reference to FIG. 4, the stretchable portion 50 of the resin member 101 includes a first portion 51, a second portion 52, and the extending portion 10. The first portion 51 extends out along the longitudinal direction L of the resin member 101 from the base portion 60. The second portion 52 is not connected to the base portion 60 and is disposed (shifted) at a position different from the first portion 51 in a direction crossing (in FIG. 4, orthogonal to) the longitudinal direction L. The extending portion 10 connects the first portion 51 to the second portion 52, and a direction of connecting the first portion 51 to the second portion 52 becomes the extending direction 11 of the extending portion 10.

In FIG. 4, two first portions 51, two second portions 52, and four extending portions 10 are drawn, however, the numbers of these portions are not limited thereto. Further, the first portions 51, the second portions 52, and the extending portions 10 are all formed in a rectangular shape when seen in a plan view, however, the shapes thereof are not limited thereto, and the portions can be formed in an arbitrary shape in consideration of the structural strength.

Figure 5:
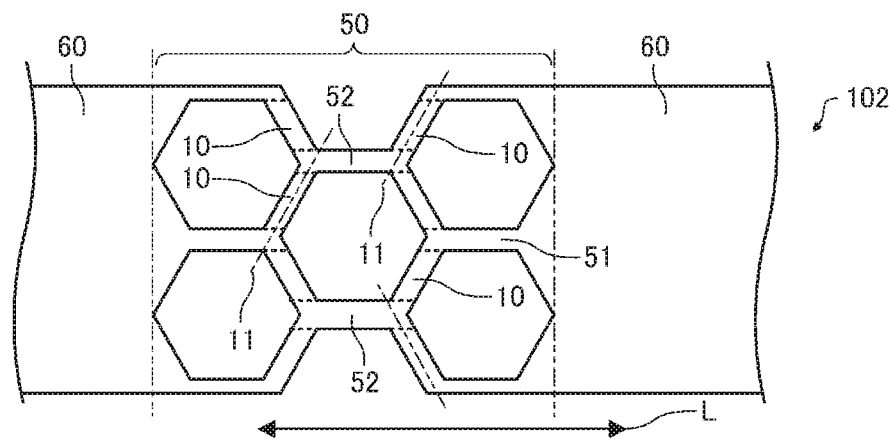
FIG. 5 is a schematic view of an example of a resin member according to an embodiment when seen in a plane view.
Figure 6:
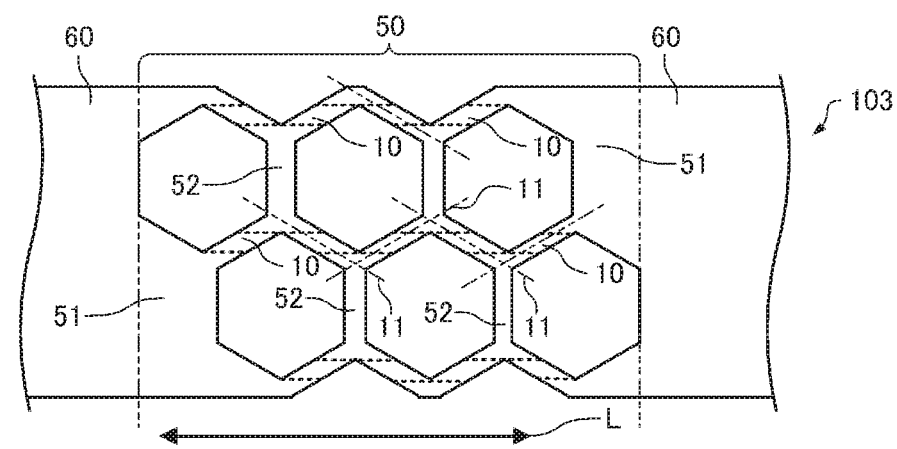
FIG. 6 is a schematic view of an example of a resin member according to an embodiment when seen in a plane view.

FIGS. 5 and 6 are schematic views for illustrating other examples of the stretchable portion 50. Also in a resin member 102 and a resin member 103 in FIGS. 5 and 6, two base portions 60 are connected to each other through the stretchable portion 50. The stretchable portion 50 of each of the resin member 102 and the resin member 103 includes a first portion 51, a second portion 52, and an extending portion 10. The first portion 51 extends out along the longitudinal direction L of the resin member 102 from the base portion 60. The second portion 52 is disposed without being connected to the base portion 60. Further, the second portion 52 is disposed so as to be shifted to a position different from the first portion 51 in a direction crossing the longitudinal direction L. The extending portion 10 connects the first portion 51 to the second portion 52, and a direction of connecting the first portion 51 to the second portion 52 becomes the extending direction 11 of the extending portion 10.

Also in each of the resin member 102 and the resin member 103 in FIGS. 5 and 6, the extending portion 10 extends in a direction crossing the longitudinal direction L. The extending direction 11 is a direction crossing the longitudinal direction L. When each of the resin member 102 and the resin member 103 is stretched in the longitudinal direction L, the angle formed by the extending direction 11 of the extending portion 10 and the longitudinal direction L changes.

In each of the resin member 102 and the resin member 103 in FIGS. 5 and 6, the stretchable portion 50 is formed in a hexagonal shape when seen in a plan view by a thickness reduction process. Such a honeycomb structure is one of the particularly preferred shapes of the stretchable portion 50.

Figure 7:
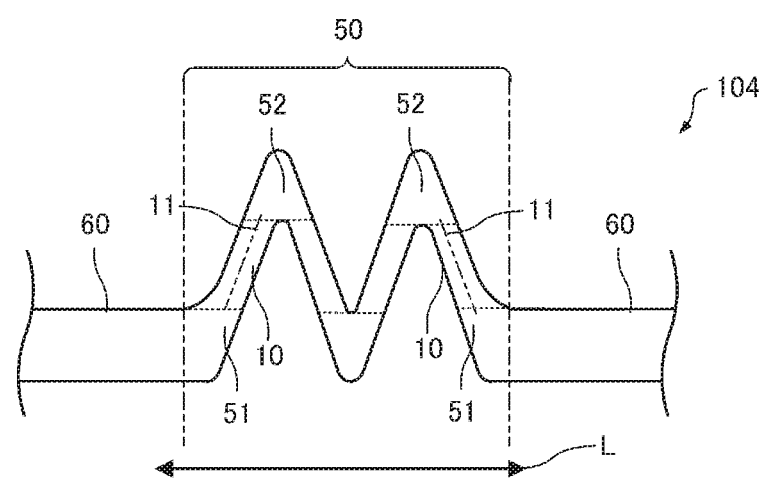
FIG. 7 is a schematic view of an example of a resin member according to an embodiment when seen in a side view.

FIG. 7 is a schematic view illustrating a modification example of the stretchable portion 50. FIG. 7 is a schematic view of a resin member 104 in the form of a belt when seen in a side view. The width (the depth direction in FIG. 7) of the resin member 104 is arbitrary, but is assumed to be a width capable of defining the longitudinal direction L as described above.

The resin member 104 in FIG. 7 is shaped like a wave which is waving in the thickness direction (in the vertical direction in FIG. 7). Also in the resin member 104 in FIG. 7, two base portions 60 are connected to each other through the stretchable portion 50. The stretchable portion 50 of the resin member 104 includes a first portion 51, a second portion 52, and an extending portion 10. The first portion 51 extends out along the longitudinal direction L of the resin member 104 from the base portion 60. The second portion 52 is disposed without being connected to the base portion 60. Further, the second portion 52 is disposed so as to be shifted to a position different from the first portion 51 in a direction crossing the longitudinal direction L. The extending portion 10 connects the first portion 51 to the second portion 52, and a direction of connecting the first portion 51 to the second portion 52 becomes the extending direction 11 of the extending portion 10.

Also in the resin member 104 in FIG. 7, the extending portion 10 extends in a direction crossing the longitudinal direction L. The extending direction 11 is a direction crossing the longitudinal direction L. When the resin member 104 is stretched in the longitudinal direction L, the angle formed by the extending direction 11 of the extending portion 10 and the longitudinal direction L changes. Also in the example shown in FIG. 7, the direction of connecting the first portion 51 to the second portion 52 is the extending direction 11 of the extending portion 10.

The shape of the entire stretchable portion 50 including the extending portion 10 is not limited to the shapes exemplified above, and may be, for example, a mesh-like pattern, an arabesque-like pattern, a Magatama (comma-shaped bead)-like pattern, a Japanese pattern shape, a pattern as if it were obtained using a continuous string, or a shape including a combination of two or more types selected from these or the like. Even in the case of such a shape, if a portion which exhibits a similar change of the extending portion 10 in the extending direction 11 or a similar function to that of the extending portion 10 described above exists, this is included in the aspect of this embodiment. Further, also in the case of such a shape, if a first portion 51, a second portion 52, and an extending portion 10 can be defined in the same manner as described above, this is included in the aspect of this embodiment.

1.2. Material of Stretchable Portion

The material of the stretchable portion 50 contains cellulose fibers and a resin. Since the material of the stretchable portion 50 contains cellulose fibers and a resin, the mechanical strength (tear strength or the like) of the stretchable portion 50 is enhanced, and a sufficient restoring force based on structural elasticity can be obtained.

1.2.1. Cellulose Fibers

In the stretchable portion 50 of the resin member 100 according to this embodiment contains cellulose fibers. The cellulose fibers may be contained in the entire resin member 100. Cellulose is a polymer in which β-glucose molecules are linearly polymerized through a glycosidic bond. The cellulose fiber may include a molecular structure which is not cellulose in, for example, a part of a branched structure or the like as long as it includes such a cellulose unit. Therefore, the cellulose fibers each have a molecular structure represented by the following formula (I).

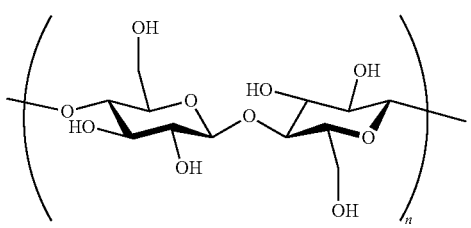

(I)

In the formula (I), n represents an integer of 10 or more and 100000 or less.

The molecule of the cellulose fiber may be modified with a dye, however, it is more preferred that the molecule is not denatured from the viewpoint that the strength is kept high. As the cellulose fiber, for example, a nanofiber, a regenerated pulp, a pulp, or the like can be used. The cellulose fiber is a fiber which has a string shape or a ribbon shape as a basic shape, and may be an independent single fiber or a material in which a plurality of fibers are intertwined with one another and formed into a string shape or a ribbon shape as a whole. Further, the cellulose fiber may have a linear form or a curved form as a whole, and further may have a frizzled form. The shape of the cross section of the cellulose fiber is also not particularly limited, and may be a circular shape, an elliptical shape, a polygonal shape, or a shape formed by combining these. Further, it may be a fibrillated fiber or a nanofiber.

The cellulose fiber to be used in this embodiment when adopting an independent single fiber has an average diameter (in the case where the shape of the cross section is not a circle, the maximum length among the lengths in a direction perpendicular to the longitudinal direction or when assuming a circle having the same area as the area of the cross section, the diameter of the circle (circle equivalent diameter)) of 2 nm or more and 100 μm or less, preferably 3 nm or more and 50 μm or less, more preferably 4 nm or more and 10 μm or less, further more preferably 4 nm or more and 1 μm or less on average.

The length of the cellulose fiber to be used in this embodiment is not particularly limited, however, in the case of adopting an independent single fiber, the length along the longitudinal direction of the fiber is 400 nm or more and 5 mm or less, preferably 500 nm or more and 3 mm or less, more preferably 1 μm or more and 2 mm or less. The length of the cellulose fiber may have a variation (distribution), and with respect to the length of an independent single fiber, in a distribution obtained from n (n≥100) samples, when assuming a normal distribution, σ may be 1 μm or more and 1000 μm or less, preferably 500 nm or more and 500 μm or less.

The aspect ratio (the ratio of the length to the diameter) of the cellulose fiber is preferably 100 or more, more preferably 200 or more, further more preferably 300 or more. In the case where the length of the cellulose fiber is short or the aspect ratio of the cellulose fiber is small, the mechanical strength of the stretchable portion 50 may be sometimes insufficient, however, when the length and the aspect ratio are within the above ranges, a sufficient strength can be obtained.

The thickness (diameter) and the length of the cellulose fiber can be measured using any of various light microscopes, scanning electron microscopes (SEM), transmission electron microscopes, fiber testers, and the like. In the case of microscopic observation, by appropriately subjecting a sample to be observed to a pretreatment as needed, cross-sectional observation, observation in a state where both ends of an independent single fiber are pulled so as not to be ruptured as needed, or the like can be performed.

The cellulose fibers may or may not be dyed. In the case where the stretchable portion 50 is made to have a predetermined color, when the cellulose fibers are dyed in the predetermined color and used, the external appearance of the stretchable portion 50 can be improved in some cases. That is, by making the color of the cellulose fibers and the color of the resin the same or approximate to each other, the presence of the cellulose fibers can be made not to be easily visually recognizable in appearance.

In the case where the cellulose fibers are dyed, the type and color of the dye are not limited, and a direct dye, an azoic dye, a sulfur dye, a vat dye, a reactive dye, or the like can be appropriately used. In this description, dyeing of the cellulose fibers is not regarded as denaturation of the cellulose fibers.

When the total mass of the material constituting the stretchable portion 50 is assumed to be 100%, the content of the cellulose fibers is 0.1 mass % or more and 50.0 mass % or less, preferably 0.5 mass % or more and 40.0 mass % or less, more preferably 1.0 mass % or more and 20.0 mass % or less. When the content of the cellulose fibers is within this range, a sufficient strength (tear strength or the like) can be obtained.

1.2.2. Resin

The stretchable portion 50 contains a resin. Examples of the resin include polyurethane, polysilicone, polystyrene, polyester, polyolefins, fluorine-based resins, diene-based resins, modified products thereof, crosslinked products thereof, and copolymers thereof. Further, the resin may be a mixture (blend) of a plurality of types of resins. The resin is more preferably a resin of a type which can exhibit rubber elasticity called "elastomer" among these. The elastomer may be a thermoplastic elastomer or a thermosetting elastomer.

When the total mass of the material constituting the stretchable portion 50 is assumed to be 100%, the content of the resin is 50.0 mass % or more and 99.9 mass % or less, preferably 60.0 mass % or more and 99.5 mass % or less, more preferably 80.0 mass % or more and 99.0 mass % or less. When the content of the resin is within this range, a sufficient strength (tear strength or the like) can be obtained.

The resin may or may not be colored. In the case where the stretchable portion 50 is made to have a predetermined color, when the resin is colored in the predetermined color and used, the external appearance of the stretchable portion 50 can be improved in some cases. That is, by making the color of the cellulose fibers and the color of the resin the same or approximate to each other, the presence of the cellulose fibers can be made not to be easily visually recognizable in appearance.

In the case where the resin is colored, the coloration can be performed with a coloring material such as a dye or a pigment. A colorant is not particularly limited as long as the resin can be effectively colored. Examples of such a colorant include inorganic pigments (zinc oxide, white lead, Lithopone, titanium dioxide, sedimentary barium sulfate, sedimentary barite, read lead, iron oxide, yellow lead, zinc yellow, ultramarine blue, Prussian blue, carbon black, etc.), organic pigments (polycyclic pigments, azo pigments, and lake pigments), and fluorescent pigments exhibiting photoluminescence.

1.2.3. Others

The material of the stretchable portion 50 contains the cellulose fibers and the resin described above, but may further contain another component. Examples of such a component include an antioxidant, an ultraviolet absorber, a preservative, and an anti-fungal agent.

The stretchable portion 50 is formed from the above-mentioned material, however, a portion other than the stretchable portion 50 of the resin member 100 may also be formed from the above-mentioned material. That is, the entire resin member 100 may be the material containing the cellulose fibers and the resin.

A typical material containing the cellulose fibers and the resin is a composite material in which the cellulose fibers are dispersed in the resin, however, in this case, the cellulose fibers in the resin may be uniformly dispersed in a non-oriented state or may be dispersed in an oriented state in a specific direction. Further, as one embodiment of the material containing the cellulose fibers and the resin, an embodiment in which the cellulose fibers are formed into a sheet or a fabric and this is covered with the resin may be adopted.

The mixing of the cellulose fibers and the resin can be appropriately performed, and for example, may be performed by kneading using a twin-screw kneader or the like, or may be performed by a wet process in which the cellulose fibers are mixed in a resin solution or the like.

The molding of the stretchable portion 50 can be performed by, for example, injection molding, press molding, or the like, and die cutting or the like may also be performed as needed. In addition, the molding of the stretchable portion 50 may also be performed by a method in which a solution of the resin is applied to a fabric of the cellulose fibers, followed by drying or the like. Further, the entire resin member 100 may be molded by any of the methods exemplified above. The shape of the resin member is arbitrary as long as the longitudinal direction can be defined, and the resin member has the above-mentioned structure, and a plate shape, a shape in which a hole passing through a plate is opened, a shape with concavity and convexity not passing through a plate, a mesh-like shape, or the like can be adopted.

1.2.4. Analysis of Material

The material of the stretchable portion 50 can be confirmed, for example, as follows.

XRD

It can be confirmed that the cellulose fibers are contained in the stretchable portion 50 by obtaining the diffraction patterns of cellulose types I and II by X-ray diffractometry.

SEM

The presence of the cellulose fibers can also be confirmed by scanning electron microscopic observation.

Dyeing

The resin is dissolved or swollen in a solvent, followed by centrifugation, filtration, etc., whereby only the fibers are extracted. The type of the extracted fibers can be specified using a reagent for fiber discrimination (for example, BOKENSTAIN II, BOKEN QUALITY EVALUATION INSTITUTE) or the like. However, this method is limited to the case where a fiber piece is not dyed.

Analysis

It can be examined whether or not a fiber piece is cellulose by analyzing the chemical structure of the extracted fibers by infrared spectrophotometry and nuclear magnetic resonance spectrometry.

1.3. Operation and Effect

The resin member according to this embodiment includes the stretchable portion 50 having the extending portion 10 extending in a direction crossing the longitudinal direction L, and when the resin member is stretched in the longitudinal direction L, an angle formed by the extending direction 11 of the extending portion 10 and the longitudinal direction L changes. The material of the stretchable portion 50 contains cellulose fibers and a resin. Therefore, the stretchable portion 50 has a structural restoring force, a high mechanical strength, and moderate stretchability. Therefore, for example, when the resin member is used as a band (belt) of a watch, the watch is easily brought into close contact with the wrist, and also can be fixed to the wrist while preventing the watch from being easily displaced. Further, in the resin member according to this embodiment, at least the stretchable portion 50 contains the cellulose fibers and the resin, and therefore, when the resin member comes into contact with the skin of animals including humans, it hardly damages the skin. Further, the cellulose fibers and the resin are easily colored, and can be freely dyed or colored.

From such a viewpoint, the resin member according to this embodiment can be favorably used for wearable devices, clothes, household electric appliances, toys, etc.

2. WEARABLE BAND

A wearable band according to this embodiment includes the above-mentioned resin member. The wearable band is a band (belt) which can be worn on animals, and examples thereof include wrist bands, bracelets, anklets, rings, chokers, and collars. If the above-mentioned resin member is applied to the wearable band, when the wearable band is attached, the wearable band can be made not to be easily displaced without tightening too much. Further, by using the wearable band, a measurement device (for example, a pulse meter or the like) can be brought into close contact with a subject. As a representative example of the device, a smartwatch in which a pulse meter or the like is mounted on a watch can be exemplified.

3. EXAMPLES AND COMPARATIVE EXAMPLES

Dyeing of Cellulose Fibers with Direct Dye

Methylene blue which is a direct dye was dissolved in water at 1 wt %, thereby preparing a dye solution. The resulting dye solution was added to each of a material obtained by adding water to broadleaf tree kraft pulp to prepare a 1 wt % dispersion and processing the dispersion in a mixer to loosen the pulp, and a material obtained by diluting cellulose nanofibers BiNFi-s (2 wt %) manufactured by SUGINO MACHINE LIMITED CO., LTD. to 1 wt % with water. After 20 minutes, the dye solution, water, the dyed broadleaf tree kraft pulp, and the dyed cellulose nanofibers were separated by vacuum filtration. The dyed broadleaf tree kraft pulp and the dyed cellulose nanofibers were sufficiently washed with water, ethanol, and acetone, thereby preparing the dyed broadleaf tree kraft pulp and the dyed cellulose nanofibers.

Resin Composite and Molding Process

The dyed cellulose nanofibers and the dyed broadleaf tree kraft pulp were separately kneaded with a urethane resin (TPSiV 4200-60A, manufactured by Dow Corning Toray Co., Ltd.) using a twin-screw kneader, thereby preparing composite pellets containing cellulose at 20 mass %. The resulting pellets were molded into the shape of a watch belt as shown in FIG. 1 using an injection molding machine.

Resin Composite and Molding Process

The dyed cellulose nanofibers and the dyed broadleaf tree kraft pulp were separately kneaded with a urethane resin (TPSiV 4200-60A, manufactured by Dow Corning Toray Co., Ltd.) using a twin-screw kneader, thereby preparing composite pellets containing cellulose at 20 mass %. The resulting pellets were molded into the shape of a watch belt as shown in FIG. 1 using a hot press.

Wearing Evaluation Results

Each of the watch belt obtained by injection molding and the watch belt obtained by hot pressing was attached to a watch. Both watches gave favorable wearing feeling and tightening feeling, and did not cause displacement or the like even in a sweating state after performing running for 10 minutes while wearing the watch. Further, it was confirmed that the stretchable portion was deformed as described in the above-mentioned embodiment by visual observation.

Physical Property Evaluation Results

Aside from the watch belts of the above-mentioned Examples, as Comparative Examples, watch belts as shown in FIG. 1 were molded using an injection molding machine and by press molding in the same manner except that cellulose was not contained. Then, a tensile strength and an elastic modulus of each of the watch belts were measured. As a result, it was found that in Example in which the broadleaf tree kraft pulp was contained at 20 mass %, the tensile strength was 1.5 times and the elastic modulus was 1.8 times larger than those of the band of Comparative Example. It was also found that in Example in which the cellulose nanofibers were contained at 20 mass %, the tensile strength was 2.0 times and the elastic modulus was 2.2 times larger than those of the band of Comparative Example. From these results, it is found that by forming the stretchable portion from the material of Example, the strength can be enhanced and the weight can be reduced. Further, it was found that the degree of freedom of designing the band can also be improved.

The present disclosure is not limited to the above-mentioned embodiments and various modifications can be made. The present disclosure includes substantially the same configurations (for example, configurations having the same functions, methods, and results, or configurations having the same objects and effects) as the configurations described in the embodiments. Further, the present disclosure includes configurations in which a part that is not essential in the configurations described in the embodiments is substituted. Further, the present disclosure includes configurations having the same effects as in the configurations described in the embodiments, or configurations capable of achieving the same objects as in the configurations described in the embodiments. In addition, the present disclosure includes configurations in which known techniques are added to the configurations described in the embodiments.

What is claimed is:

1. A resin member having a longitudinal direction and a plane, the resin member comprising:
    a first base portion that extends in the longitudinal direction;
    a stretchable portion having an extending portion that extends in a direction that crosses the longitudinal direction, the extending portion extending along the plane; and
    a second base portion that extends in the longitudinal direction, and is connected to the first base portion through the stretchable portion,
    wherein when the resin member is stretched in the longitudinal direction, an angle formed between the longitudinal direction and the direction in which the extending portion extends changes, and
    the material of the stretchable portion contains a cellulose fiber and a resin.

2. The resin member according to claim 1, wherein the cellulose fiber is dyed.

3. The resin member according to claim 1, wherein the cellulose fiber has a diameter of 4.0 nm or more and 1.0 µm or less.

4. The resin member according to claim 1, wherein the cellulose fiber has an aspect ratio of 100 or more.

5. The resin member according to claim 1, wherein the resin is an elastomer.

6. The resin member according to claim 1, wherein the resin is one type or a mixture of two or more types selected from a urethane-based resin, a silicone-based resin, a styrenic resin, an ester-based resin, an olefinic resin, a fluorine-based resin, and a diene-based resin.

7. The resin member according to claim 1, wherein the cellulose fiber is contained in an amount of 0.1 mass % or more and 50.0 mass % or less with respect to the total amount of the resin member.

8. The resin member according to claim 1, wherein the cellulose fiber has a molecular structure represented by the following formula (I):

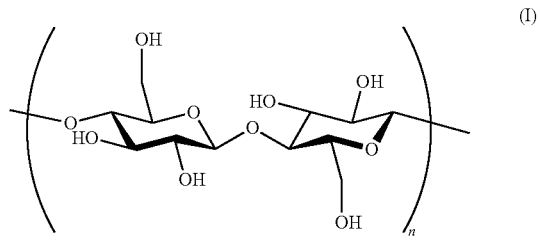

wherein n represents an integer of 10 or more and 100000 or less.

9. A wearable band, comprising the resin member according to claim 1.

10. A resin member having a longitudinal direction, the resin member comprising:
    a first end; and
    an opposite second end that are connected by a stretchable portion, the stretchable portion including:

a first pair of arms that each extend in a direction transverse to the longitudinal direction toward a center of the resin member, and a first connection arm that extends in the longitudinal direction between terminal ends of the first pair of arms; and a second pair of arms that extend toward the first pair of arms in the direction transverse to the longitudinal direction toward the center of resin member, and a second connection arm that extends in the longitudinal direction between terminal ends of the second pair of arms, wherein the first and second connection arms extend parallel to each other and are spaced apart by a gap, wherein, when the resin member is stretched in the longitudinal direction, an angle at which the first and second pair of arms each extend changes, and the material of the stretchable portion contains a cellulose fiber and a resin.

11. The resin member according to claim 10, wherein the cellulose fiber is dyed.

12. The resin member according to claim 10, wherein the cellulose fiber has a diameter of 4.0 nm or more and 1.0 μm or less.

13. The resin member according to claim 10, wherein the cellulose fiber has an aspect ratio of 100 or more.

14. The resin member according to claim 10, wherein the resin is an elastomer.

15. The resin member according to claim 10, wherein the resin is one type or a mixture of two or more types selected from a urethane-based resin, a silicone-based resin, a styrenic resin, an ester-based resin, an olefinic resin, a fluorine-based resin, and a diene-based resin.

16. The resin member according to claim 10, wherein the cellulose fiber is contained in an amount of 0.1 mass % or more and 50.0 mass % or less with respect to the total amount of the resin member.

17. The resin member according to claim 10, wherein the cellulose fiber has a molecular structure represented by the following formula (I):

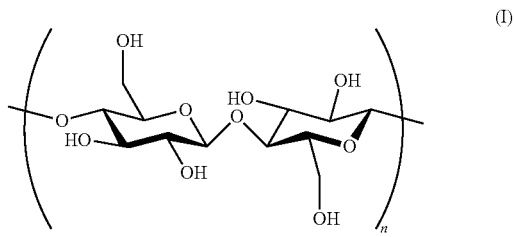

wherein n represents an integer of 10 or more and 100000 or less.

18. A wearable band, comprising the resin member according to claim 10.

* * * * *